US007844966B1

(12) United States Patent
Chan (10) Patent No.: US 7,844,966 B1
(45) Date of Patent: Nov. 30, 2010

(54) SYSTEM AND METHOD FOR GENERATING COMPUTING SYSTEM JOB FLOWCHARTS

(75) Inventor: Bing-Kong Chan, Sydney (AU)

(73) Assignee: American Express Travel Related Services Company, Inc., New York, NY (US)

( * ) Notice: Subject to any disclaimer, the term of this patent is extended or adjusted under 35 U.S.C. 154(b) by 1244 days.

(21) Appl. No.: 11/160,829

(22) Filed: Jul. 12, 2005

(51) Int. Cl.
*G06F 9/46* (2006.01)
*G06F 17/00* (2006.01)

(52) U.S. Cl. .................. 718/101; 718/102; 715/200; 715/226; 715/231; 715/249; 705/7; 705/9

(58) Field of Classification Search ............ 718/1, 718/100, 101, 102
See application file for complete search history.

(56) References Cited

U.S. PATENT DOCUMENTS

| | | | | |
|---|---|---|---|---|
| 6,235,176 B1 * | 5/2001 | Schoen et al. | ............ | 705/4 |
| 6,289,368 B1 * | 9/2001 | Dentler et al. | ............ | 718/101 |
| 6,337,748 B1 * | 1/2002 | Murata et al. | ............ | 358/1.4 |
| 6,519,568 B1 * | 2/2003 | Harvey et al. | ............ | 705/1 |
| 6,832,201 B1 * | 12/2004 | Leymann et al. | ............ | 705/7 |
| 2002/0010746 A1 * | 1/2002 | Jilk et al. | ............ | 709/206 |
| 2002/0062239 A1 * | 5/2002 | Smith et al. | ............ | 705/8 |
| 2003/0159128 A1 * | 8/2003 | Kunzler | ............ | 717/109 |
| 2004/0015818 A1 * | 1/2004 | McDonald et al. | ............ | 717/102 |
| 2004/0049531 A1 * | 3/2004 | Honda et al. | ............ | 709/201 |
| 2005/0273272 A1 * | 12/2005 | Brando et al. | ............ | 702/19 |
| 2006/0004866 A1 * | 1/2006 | Lawrence et al. | ............ | 707/104.1 |
| 2007/0033591 A1 * | 2/2007 | Kline et al. | ............ | 718/102 |
| 2008/0222195 A1 * | 9/2008 | Marr et al. | ............ | 707/102 |

OTHER PUBLICATIONS

Angeles, M. "Automating Diagrams with Viso", Apr. 9, 2002.*

* cited by examiner

*Primary Examiner*—Lewis A Bullock, Jr.
*Assistant Examiner*—Jennifer N To
(74) *Attorney, Agent, or Firm*—Snell & Wilmer L.L.P.

(57) ABSTRACT

A system and method for automatically generating flowcharts based on jobs within a mainframe job scheduling system is disclosed. The system may be interfaced through a web browser over a network (e.g., Internet) in order to configure a job flowchart request. The system includes a job flow utility employing rules and logic to execute a Job Control Language (JCL) script thereby invoking the creation of a job schedule based from a scheduling library and generates a delimited set of data that is stored within a database or saved as a delimited text file. The system also enables a user to view a job flowchart online or download the text-delimited file to open within existing charting applications.

19 Claims, 6 Drawing Sheets

SYSTEM AND METHOD FOR GENERATING COMPUTING SYSTEM JOB FLOWCHARTS

FIELD OF INVENTION

The invention generally relates to automatic generation of computing system job flowcharts via flowcharting software, and more particularly, to a system and method for automatic creation of a text interface file based on a job scheduling library.

BACKGROUND OF INVENTION

The rapid expansion of computing needs, brought about in part by the Internet, has often required enterprises to find more efficient and reliable ways to manage limited computing resources within mainframe computing environments. Prior to the Internet, requests for applications and data usually originated from within the enterprise, therefore managing computing resources was not as important of an issue as it is today. However, more and more enterprises are providing services instantly to customers via the Internet, which has led to a dramatic load increase for such enterprise's mainframe computing infrastructure. Therefore, tools and methodology for managing workload where computing resources are limited have become increasingly critical.

In addition to managing a workload in an efficient manner, the workload must be managed in an intelligent manner. For example, a mainframe may have a variety of pending requests. Requests may include requests for applications, data or both. However, all requests are not necessarily equal and some may be more critical or time sensitive than others. As a result, processing according to the "first in, first out" methodology may not be practical in many cases. Therefore, tools have been developed to allow mainframe administrators and managers to classify requests, wherein a request's classification is a determining factor on when and how it will be processed. In the realm of mainframe computing, requests are otherwise referred to as jobs, as a request represents a job to be executed such as, for example, a database query for all sales transactions during a given timeframe. A series of jobs comprise a workload.

One such tool for managing workloads within the mainframe environment is CA-Jobtrac, which was developed by Computer Associates of New York for the IBM mainframe-computing platform. CA-Jobtrac provides features to allow administrators and managers to streamline administrative tasks such as, for example, scheduling jobs according to application, process period, location or by any combination of scheduling methods. CA-Jobtrac and like scheduling tools typically employ a scheduling library which defines which processes run at defined times as well as any dependencies between the processes. However, these schedules can become quite complex and mainframe administrators often need to track the schedules in order to ensure jobs are scheduled properly and efficiently. It is also important to understand the job schedules and interdependencies of the jobs in the case of a catastrophic failure. If job dependencies are wrongly interpreted, for example, the processing sequence of the jobs in the schedule will be wrongly executed, potentially leading to failed disaster recovery efforts. Traditionally, administrators and engineers have viewed job schedules and manually created flowcharts based on job schedules and interdependencies. However, this is a time-consuming task often requiring extensive analysis of the job schedule.

Therefore, a need exists for a system and method to automatically generate job flowcharts. Further, there is a need for a convenient and easy-to-use interface for requesting and configuring job flowcharts and receiving completed flowcharts online, as well as having the ability to download and open a job flowchart in a charting program for manipulation.

SUMMARY OF INVENTION

The invention enables a mainframe administrator to view job flowcharts within charting applications, such a Microsoft Visio®, by providing a utility configured to create a file that is compatible with a charting application, wherein the file is based on job information relating to certain mainframe computers. More specifically, the present invention provides a utility capable of creating a text interface file based on a job scheduling library. The text interface file is downloaded to a user's personal computer where it may be opened and viewed within a compatible charting application. A job flowchart illustrates the various jobs from within the scheduling library along with their dependencies. Moreover, the invention will automate the creation of job flowcharts at regular intervals to assist the administrator in ensuring that the job flowchart reflects the current production system job flow.

The invention creates a text interface file by reading a job schedule from a job scheduling library and analyzing the job dependencies within a scheduling library member, removing any redundancy of job dependencies and generating a text interface file. In order to be read by a charting program, the text interface file is formatted by the invention according to the standards of the charting program. Further, the text interface file may contain information representative of the individual jobs within the scheduling library. Each job within the text interface file may be defined by shape definitions, job name, period of time when the job runs, link entries for each job and the like.

The utility is configured and initiated from a remote user computer with a network connection to the utility. A web interface further provides the administrator with a convenient and easily accessible interface to the utility. In one embodiment, a web interface is used to initiate the utility and download the resulting text interface file or to retrieve a pre-generated text interface file. In another embodiment, the text interface file can be viewed directly from a web browser by converting, for example, a charting application file into an HTML file.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

Figure 1:
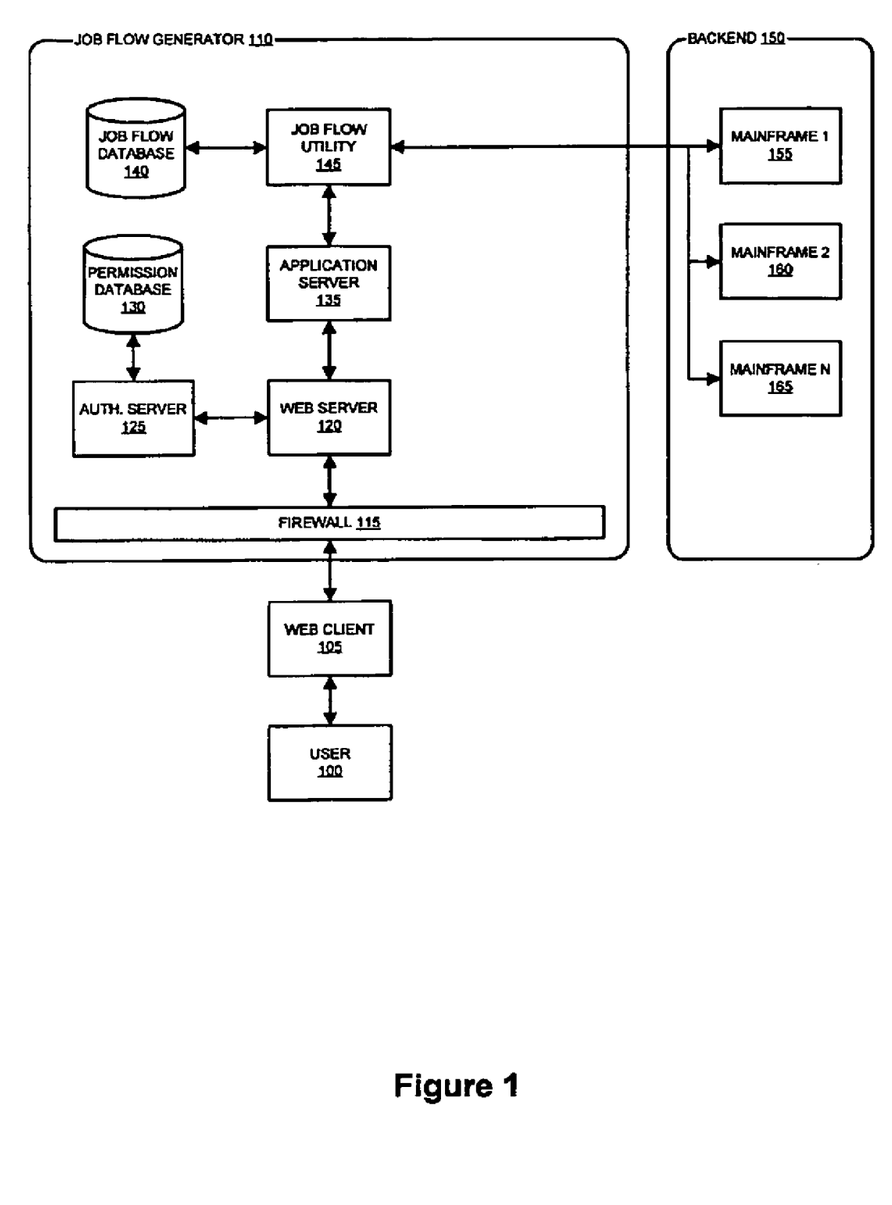
FIG. 1 is a block diagram illustrating the major system components for an exemplary job flowchart generator according to one embodiment of the invention.

In general, the invention includes a system and method for generating a job flowchart based on the content of one or more job scheduling libraries. The invention creates delimited data relating to the job-scheduling library wherein the data is formatted in accordance with a charting program. With reference to FIG. 1, the job flow generator 110 enables a user 100 to interact with the job flow utility 145 through a web client 105. Web client 105 is connected to a web server 120 through a network connection (e.g., Internet, Intranet, LAN, WAN). Web server 105 may employ an authentication server 125 in order to validate and afford proper permissions to authorized users of the system. Permission database 130 stores user credentials and permissions specific to each user. Web server 120 also employs an applications server 135 to manage various applications utilized by the system. Application server 135 may be a stand-alone server or may comprise software residing within web server 120.

Job flow utility 145 is invoked by application server 135 to process user 100 requests to generate job flowcharts. Job flow utility 145 stores data relating to job flowcharts and requests within job flow database 140. Job flow utility 145 also interfaces with one or more mainframe computers 155, 160, 165 to read job schedules from one or more job schedule libraries. Those skilled in the art will appreciate that varying technologies may be implemented to facilitate communications between disparate computing architectures. If the job flow utility 145 is implemented within a Windows OS environment, for example, the invention may further include a middleware product to enable communications between the systems of the job flow generator 110 and the mainframe systems of the backend 150. Middleware products are known in the art and available commercially.

As will be appreciated by one of ordinary skill in the art, the invention may be embodied as a customization of an existing system, an add-on product, upgraded software, a stand alone system (e.g., kiosk), a distributed system, a method, a data processing system, a device for data processing, and/or a computer program product. Accordingly, the invention may take the form of an entirely software embodiment, an entirely hardware embodiment, or an embodiment combining aspects of both software and hardware. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

User 100 may include any individual, business, entity, government organization, software and/or hardware which interacts with the invention to configure a job flow utility 145 and/or receive job flowcharts based on one or more job scheduling library. User 100 may be, for example, a mainframe administrator who receives regular job flowcharts in order to ensure jobs are being processed in the most efficient manner. User 100 may interface with job flow generator 110 via any communication protocol, device or method discussed herein or known in the art. In one embodiment, user 100 may interact with the invention via an Internet browser.

Web client 105 may comprise any hardware and/or software suitably configured to facilitate input, receipt and/or review of any information related to job flow generator 110 or any information discussed herein. Web client 105 may include any device (e.g., personal computer), which communicates (in any manner discussed herein) with the invention via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 105 may or may not be in direct contact with the invention. For example, web client 105 may access the services of the invention through another server, which may have a direct or indirect connection to web server 120.

Web server 120 may include any hardware and/or software suitably configured to facilitate communications between web client 105 and one or more job flow generator 110 components. Further, web server 120 may be configured to transmit data to web client 105 within markup language documents. Web server 120 may operate as a single entity in a single geographic location or as separate computing components located together or in separate geographic locations. Requests originating from client browser 105 may pass through a firewall 115 before being received and processed at web server 120. As used herein, "transmit" may include sending electronic data from one system component to another over a network connection. Additionally, as used herein, "data" may include encompassing information such as commands, queries, files, data for storage, and the like in digital or any other form.

Firewall 115, as used herein, may comprise any hardware and/or software suitably configured to protect job flow generator 110 components from users of other networks. Firewall 115 may reside in varying configurations including Stateful Inspection, Proxy based and Packet Filtering among others. Firewall 115 may be integrated as software within web server 120, any other system components or may reside within another computing device or may take the form of a standalone hardware component.

Applications server 135 may include any hardware and/or software suitably configured to serve applications and data to a connected web client 105. Like the web server 120, the applications server 135 may communicate with any number of other servers, databases and/or components through any means known in the art. Further, the applications server 135 may serve as a conduit between web client 105 and the systems and components of the job flow generator 110 and the web client 105. Web server 120 may interface with an applications server 135 through any means known in the art including a LAN/WAN, for example. Application server 135 may further invoke job flow utility 145 in response to a user 100 request.

Job flow utility 145 may include any hardware and/or software suitably configured to automatically generate job flowcharts based on a request. Job flow utility 145 may exist as a standalone computing device or as a software entity stored within applications server 135 or web server 120. Job flow utility 145 may communicate directly or indirectly with one or more computing devices such as mainframe computers, for example. Further, job flow utility 145 may include business rules regarding how data from one or more scheduling libraries is to be formatted within a text delimited file or stored within job flow database 140.

In order to control access to web server 120 or any other component of the invention, web server 120 may invoke an authentication server 125 in response to submission of user 100 authentication credentials received at web server 120. Authentication server 125 may include any hardware and/or software suitably configured to receive authentication credentials, encrypt and decrypt credentials, authenticate credentials, and grant access rights according to user 100 predefined privileges attached to the credentials. Authentication server 125 may grant varying degrees of application and data level access to user 100 based on user information stored within member database 130. For example, mainframe administrator may be allowed to modify and/or re-configure existing requests for job flowcharts while a test engineer may only view existing job flowcharts.

Figure 2:
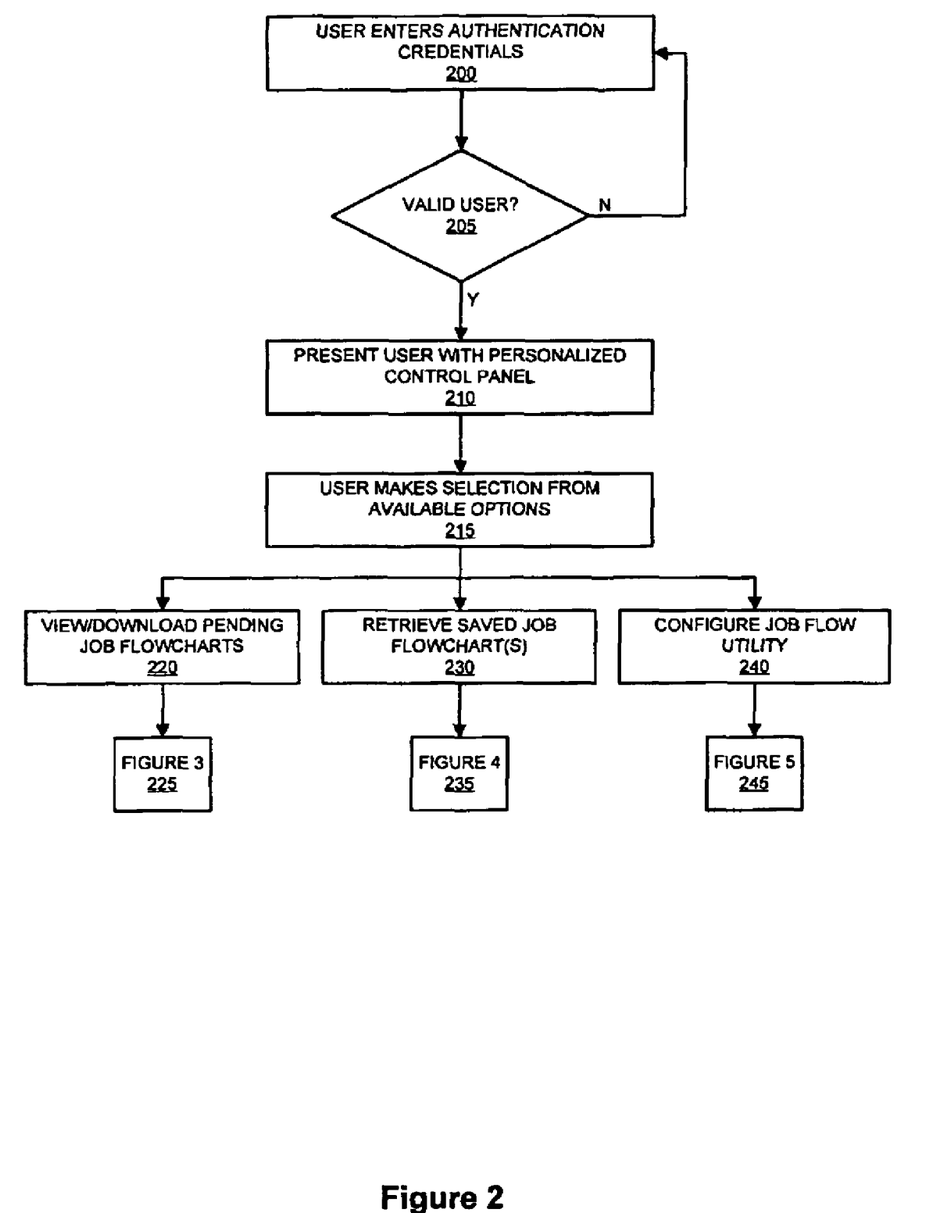
FIG. 2 is a flowchart illustrating an exemplary process for interacting with the invention through a user interface according to one embodiment.

FIG. 2 is a flowchart illustrating an exemplary process for interacting with the invention through a user interface. The invention may implement known methods for preventing access from unauthorized users such as requiring users to register and/or by assigning authorization credentials to individual users. However, an authentication server 125 is anticipated which is employed to enforce security policies by allowing varying levels of access to users based on such policies. Therefore, according to an exemplary embodiment, a user is prompted to enter authentication credentials (step 200) prior to proceeding to interact with the job flow generator 110. If authentication server 125 determines that the authentication credentials are not valid (step 205), the user is then provided another opportunity to enter valid authentication credentials (step 200).

Upon validation (step 205), the user is presented with a personalized control panel (step 210). A control panel includes website options according to, for example, the user's access privileges, status information regarding prior requests, links to newly created job flowcharts, links to configuration controls and the like. The user may select a link from the options available from the control panel (step 215) to access the related content. One such option is to view and/or download completed job flowcharts (step 220). Completed job flowcharts include, for example, previously requested job flowcharts that are ready to be viewed and/or downloaded. The process associated with viewing and/or downloading completed job flowcharts is described in greater detail in FIG. 3 (step 225).

The personalized control panel will also provide a link to retrieve saved job flowcharts (step 230). According to one embodiment, the invention automatically stores all or any subset of job flowcharts within job flow database 140 by default. This storage routine be desirable for creating an audit trail that may be referenced to any point in the past where there is a question as to whether jobs were properly scheduled or in providing useful information for disaster recovery following a catastrophic failure, for example. The process relating to retrieving saved job flowcharts will be described in greater detail in reference to FIG. 4 (step 235).

Further, the user may select to configure the job flow utility 145 in order to define how and when job flowchart requests are generated (step 240). This includes configuring and requesting one or more new job flowcharts and configuring or reconfiguring existing requests. As will be discussed in greater detail herein, a job flowchart may be configured to run at a regular interval such as, for example, hourly, daily, weekly, monthly, etc. The process of configuring the job flow utility 145 will be discussed in greater detail in reference to FIG. 5 (step 245).

Figure 3:
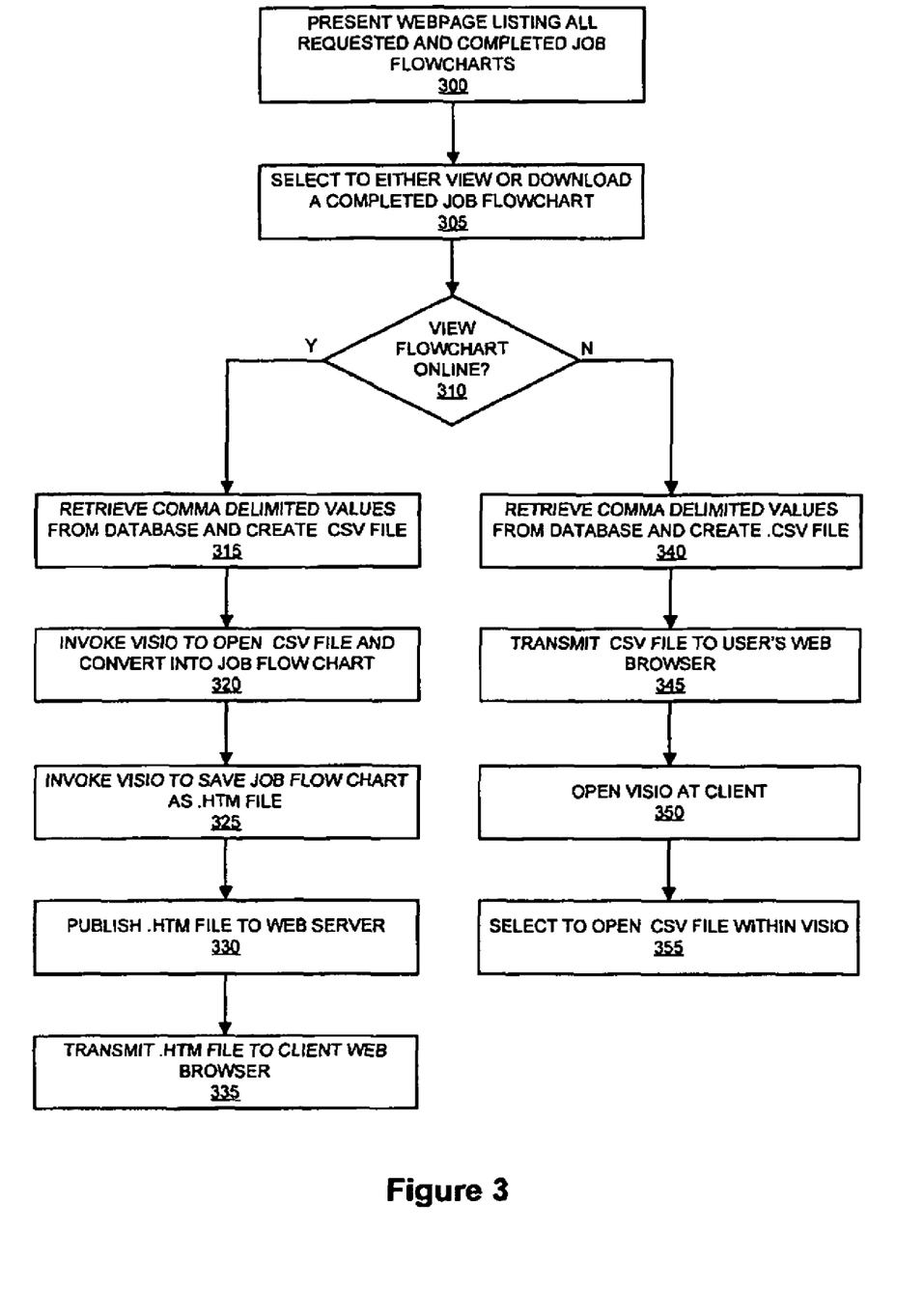
FIG. 3 is a flowchart illustrating an exemplary process for downloading and/or viewing a job flowchart that has been created by the invention according to one embodiment.

FIG. 3 is a flowchart illustrating an exemplary process for downloading and/or viewing a job flowchart that has been created in accordance with the invention. On selecting a link to view requested and completed job flowcharts (step 300), the user may select to either view or download a completed job flowchart (step 305). If the user selects to view a completed job flowchart online (step 310), then application server 135 invokes job flow utility to retrieve values to be converted into a job flowchart from job flow database 140. The values are stored within job flow database in a comma delimited format, or job flow utility may format the values with commas dividing each. In either case, job flow utility 145 creates a new file containing the comma-delimited values and saves the file with a .csv (comma separated values) file extension (step 315). Job flow utility 148 invokes a charting application through a VBA (Visual Basic for Applications) extension in order to open the newly created .csv file and convert the data from within to a flowchart (step 320). Job flow utility 145 invokes the charting application to save the job flowchart as an .htm file (step 325). The .htm file may be stored within the memory of web server 120 or any other component of the job flow generator 110. Application server 135 invokes an application to publish the newly created .htm file (step 330), thereby making it available for online viewing. The user's browser is then directed to the new .htm webpage to allow user 100 to view the job flowchart (step 335).

While the above described process creates a job flowchart and converts it to a format suitable for the Internet for fast and convenient viewing, a user wishing to manipulate the job flowchart may be somewhat limited. Therefore, the user may select a link to download a .csv file to web client's 105 local hard drive. Application server 135 invokes job flow utility 145 to retrieve values to be converted into a job flowchart from job flow database 140. The values may be stored within job flow database 140 in a comma delimited format, or job flow utility 145 may format the values with commas dividing each while building the .csv file. In either case, job flow utility 145 creates a new file containing the comma-delimited values and saves the file with a .csv (comma separated values) extension (step 315). Job flow utility 145 saves the .csv file to web server 120 where the file download process may be initiated at client browser (step 345). When the file download is complete, user 100 may open a charting application, such as Visio, to open the file (step 355). Because the .csv text interface file contains chart data as well as definitions regarding shapes, links and dependencies, the charting program can convert the text interface file into a job flowchart that can be manipulated and/or saved within the format of the charting program.

The invention contemplates at least two methods for viewing a job flowchart as described above, however practitioners will appreciate that there may be any number of ways in which data can be displayed within a flowchart. For example, in addition to viewing a job flowchart online and downloading a job flowchart file, a user could receive a chart via fax machine, printer, postal service and any other means known in the art.

Figure 4:
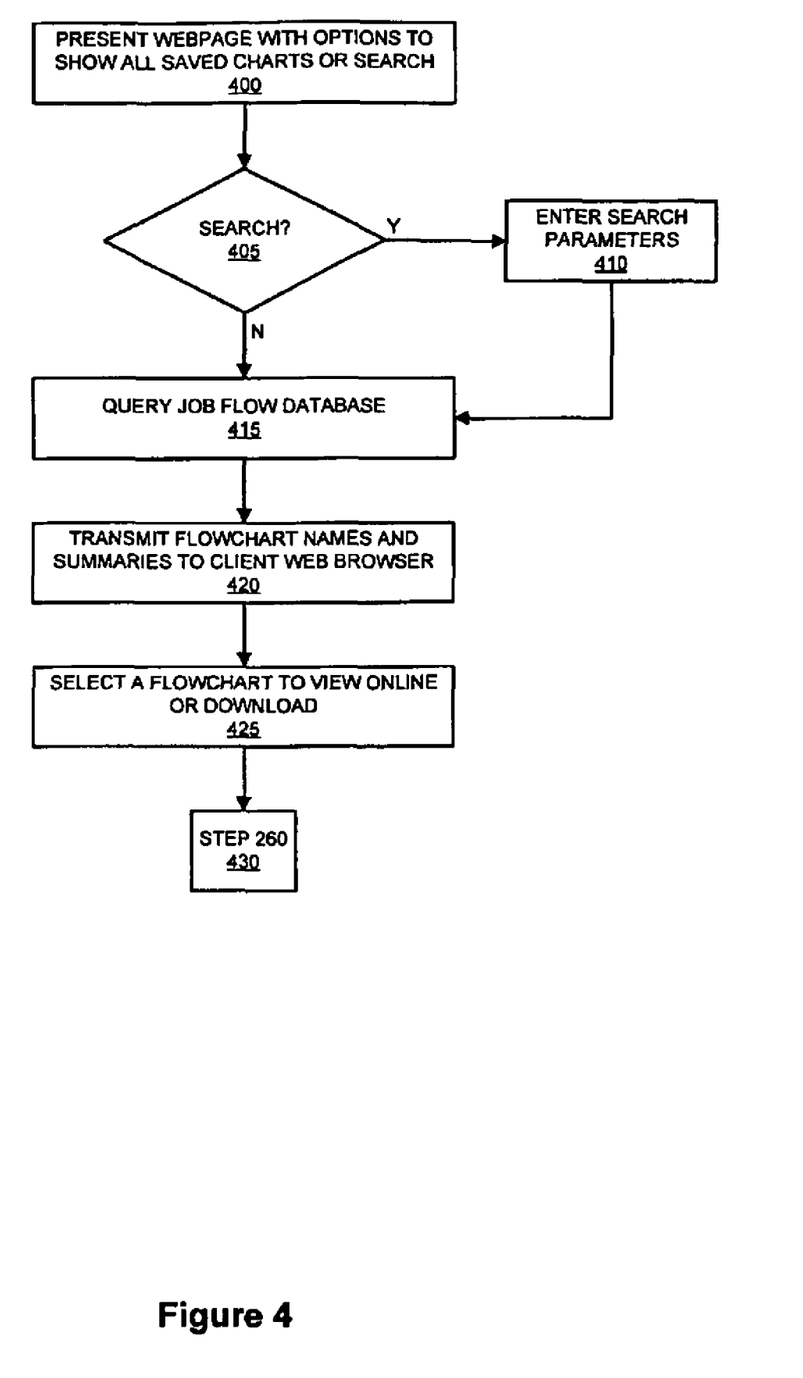
FIG. 4 is a flowchart illustrating an exemplary process for downloading and/or viewing a job flowchart that has been saved to a database according to one embodiment of the invention.

FIG. 4 is a flowchart illustrating an exemplary process for downloading and/or viewing a job flowchart that has been saved to a database. If a user has saved a job flowchart, it may be retrieved later through the following series of steps. The user is presented a webpage with options to view all saved job flowcharts, or to search for one or more specific charts (step 400). While not illustrated, a user may be presented any number of options for retrieving charts such as, for example, charts created over a defined time period, charts created by user, charts pertaining to s specific mainframe, etc. If the user selects the search option (step 405), then the user is prompted to enter search parameters (step 410). Performing a search of a database from an Internet browser is known in the art; therefore a detailed discussion regarding search methods and algorithms is not included. However, regardless of whether specific search parameters are defined, a request for data is passed to job flow utility 145 which will query job flow database 140 for one or more matching records (step 415). If records are found, information indicative of the identity of the job flowchart is transmitted to web client (step 420). Such information may include, for example, a name assigned to the chart, date the chart was created, user who created the chart, etc. From this information, the user can quickly surmise which chart they desire to view or download and select an appropriate hyperlink accordingly (step 425). The user may select one or more job flowchart to view online or download according to the steps of FIG. 2 starting with step 310 (step 430).

Figure 5:
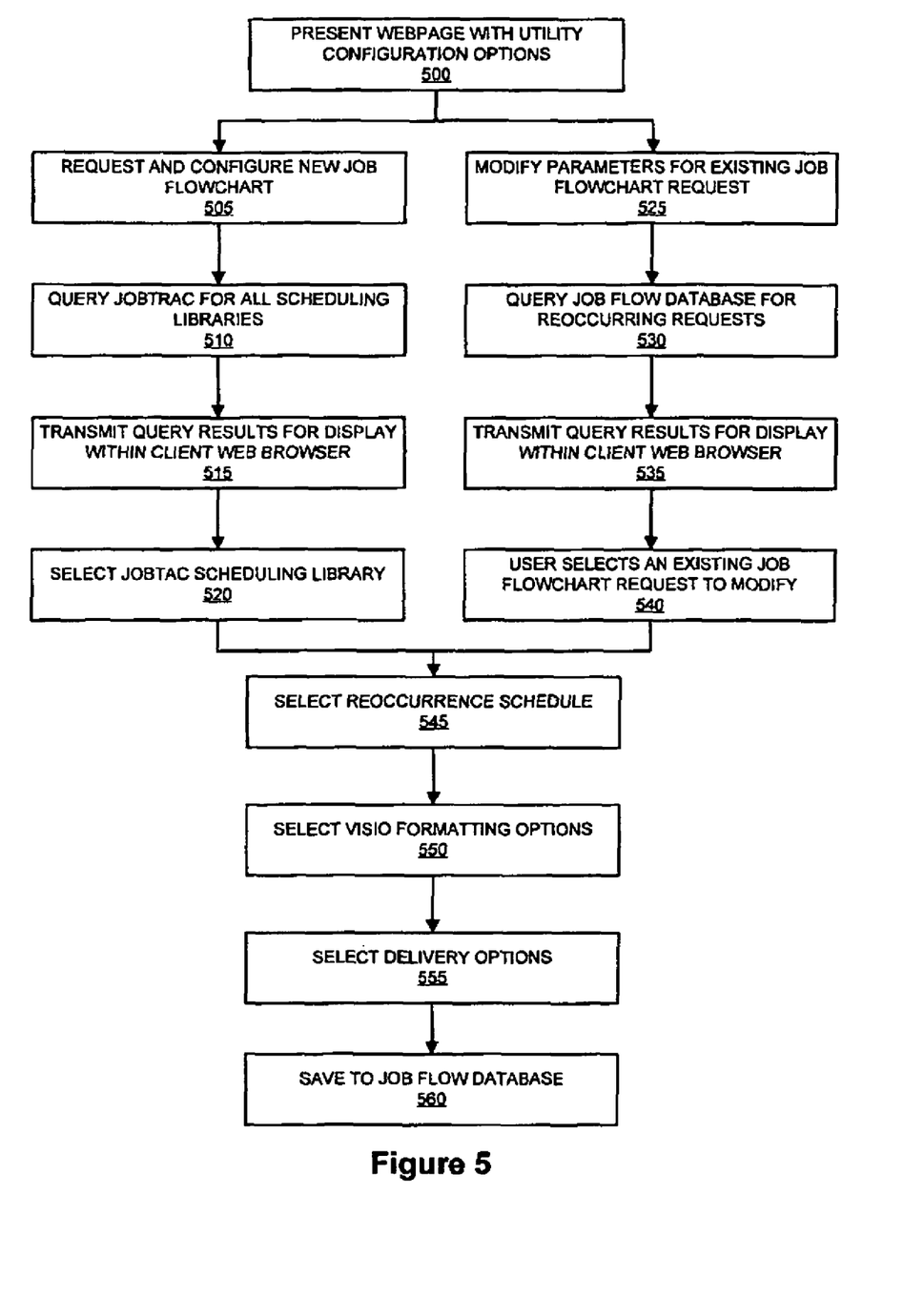
FIG. 5 is a flowchart illustrating an exemplary process for interacting with the invention through a user interface to request a new job flowchart and/or modify parameters relating to a reoccurring job flowchart according to one embodiment of the invention; and, FIG. 6 is a flowchart illustrating an exemplary process for creating a job flowchart from a job scheduling library according to one embodiment of the invention.

FIG. 5 is a flowchart illustrating an exemplary process for interacting with the invention through a user interface to request a new job flowchart and/or modify parameters relating to a reoccurring job flowchart. A user who as been given access to request and configure new job flowcharts and/or modify parameters pertaining to reoccurring job flowchart requests, can do so by selecting a link corresponding to a webpage presenting utility configuration options (step 500). To request and configure a new job flowchart (step 505), the user selects from a list of scheduling libraries (step 510). To obtain a list of scheduling libraries for display within web client (step 515), job flow utility 145 executes a request to the job scheduling systems for one or more mainframe computers. The user selects from a list of scheduling libraries (step 520) those libraries that user wishes to place a request for.

To modify parameters relating to an existing job flowchart request (step 525), job flow utility 145 queries job flow database 140 for reoccurring requests belonging to the user (step 530). A reoccurring request is a request for a job flowchart to be created on a periodic or regular basis (e.g., every Tuesday). In another embodiment, the user may be presented with a search page wherein search parameters may be entered to retrieve a specific one or more job flowchart requests. For example, a user may want to modify all requests scheduled to run on every Sunday, therefore the user can select from a criteria drop-down menu "Run Date" and enter the text "Sunday" in a search box. Results from a query of job flow database 140, are transmitted to web client (step 105) for display within the user's web browser (step 535). From a list of one or more job flowchart requests, the user may select one or more to modify.

The steps for defining or modifying request parameters for both new and existing job flowchart requests begins with, in one embodiment, the step of prompting the user to select a reoccurrence schedule (step 545), if applicable. A reoccurrence schedule may include a start and end date for which the reoccurring job flowchart is to be generated. The user may next be prompted to select charting application formatting options (step 550). Formatting options allow the user to customize job flowcharts according to the user's needs or preferences. For example, the user may want to define different shapes to represent different types of jobs. The user may further choose what type of information to include regarding jobs such as, for example, job type, job duration, dependency information and the like.

The user may further select job flowchart delivery options (step 555). Delivery options refer to the mode in which completed job flowcharts are delivered to the requestor. In one embodiment, the requestor further designates one or more additional delivery locations. For example, a mainframe administrator requesting a job flowchart can further request that the job flowchart to be delivered to the system engineer and quality assurance manager. Modes of delivery may include, for example, online, email, fax, hardcopy, etc.

When the job flowchart request has been configured, the request is saved to job flow database (step 560). The job flow utility is configured to periodically query the job flow database in order to determine if there are any requests that are due for processing. Those skilled in the art will appreciate that there are many methods known for invoking scheduled processes such as, for example, poling database and memory structures and maintaining schedules within a local memory structure of job flow utility.

Figure 6:
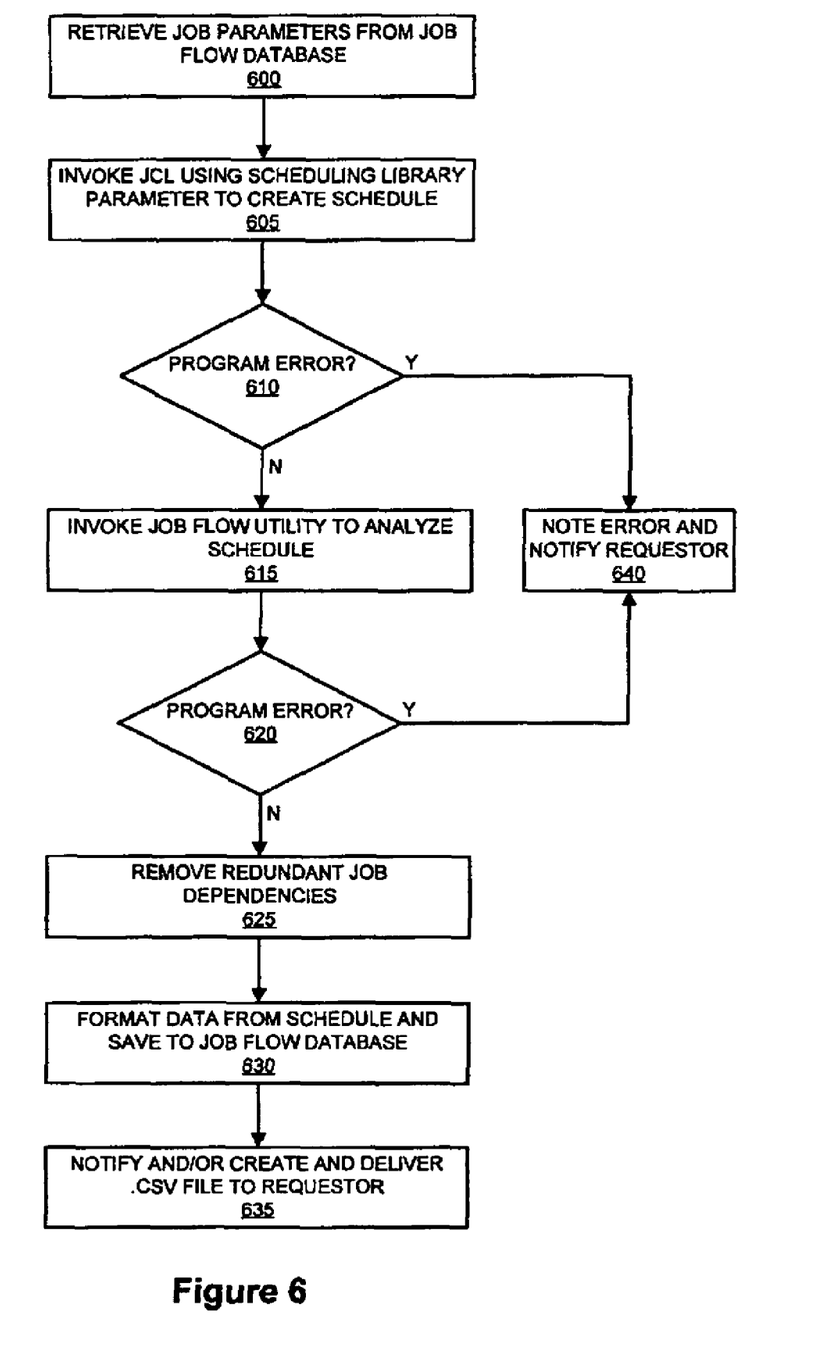

FIG. 6 is a flowchart illustrating an exemplary process for creating a job flowchart from a job-scheduling library. The functional aspects of the invention will be better understood with a more detailed description of the job flow utility 145. Job flow utility 145 creates a job flowchart by retrieving job parameters from job flow database (step 600). As described in reference to FIG. 5, parameters define, for example, which scheduling library to chart, features relating to the chart format, delivery methods and the like. Job flow utility next invokes a Job Control Language (JCL) script using the parameter defining the scheduling library to chart (step 605). If a program error is encountered as a result of a bad parameter, software failure or hardware failure (step 610), then job flow utility 145 records details regarding the error and notifies the requestor that the request failed (step 640). Notification can be executed by any means including online, email, pager, cell phone, facsimile and the like. The JCL script creates a job schedule, which includes the following information: job name, time, date, dependencies and release information. Job flow utility 145 then analyzes the job schedule to identify dependencies (step 615). If a program error occurs due to an invalid job schedule or for any other reason, job flow utility 145 may record details of the error and notify the requestor (step 640) as described above.

Job flow utility removes redundant dependencies (step 625) and formats the data from the job schedule according to the requirements of the charting program (step 630). Further, job flow utility 145 uses configuration parameters in formatting the data in order to properly create a file that will be converted into a job flowchart. As previously described in reference to FIG. 5, the user can define style related parameters relating to a chart's appearance. These parameters are used during formatting of the job schedule data to properly format the data and insert symbols and instructions that are later read by the charting program. In an exemplary embodiment, the formatted data is saved to a job flow database 140 and later converted into a .csv file if requested. In another embodiment, the formatted data may be saved to a .csv file following formatting and saved to a memory structure of web server 120 or any other memory component. The file and/or notification of the completion of the job flowchart request is then issued to the requestor by what ever means that was selected during configuration of the request (step 635).

While the steps outlined above represent an embodiment of the invention, practitioners will appreciate that there are any number of computing algorithms that may be applied to create similar results. The steps are presented for the sake of explanation only and are not intended to limit the scope of the invention in any way.

Permission database 130 may include any hardware and/or software suitably configured to facilitate storing authentication and/or privilege information relating to users 100. Job flow database 140 stores data relating to job flowchart requests including parameters and preferences. One skilled in the art will appreciate that the invention may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the invention by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the invention may consist of any combination thereof at a single location or at multiple locations, wherein each database or system includes any of various suitable security features, such as firewalls, access codes, encryption, decryption, compression, decompression, and/or the like.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially available web-browser software package.

As used herein, the term "network" shall include any electronic communications means which incorporates both hardware and software components of such. Communication among the parties in accordance with the invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, biometrics, grid computing and/or mesh computing.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NEHALEM, IT WEB SERVICES: A ROADMAP FOR THE ENTERPRISE (2003), hereby incorporated by reference.

The invention may be described herein in terms of functional block components, screen shots, optional selections and various processing steps. It should be appreciated that such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, the software elements of the invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Referring now to FIGS. 2-6 the process flows depicted are merely embodiments of the invention and are not intended to limit the scope of the invention as described above. For example, the steps recited in any of the method or process descriptions may be executed in any order and are not limited to the order presented. It will be appreciated that the following description makes appropriate references not only to the steps depicted in FIGS. 2-6, but also to the various system components as described above with reference to FIG. 1. Further, illustrations of the process flows and the descriptions thereof make reference to webpages, websites, web forms, prompts, etc. Practitioners will appreciate that the illustrated steps described below may exist in any number of configurations including the use of webpages, web forms, popup windows, prompts and the like. It should be further appreciated that the multiple steps as illustrated and described may be combined onto single webpages but have been expanded for the sake of simplicity. In other cases, steps illustrated and described as single process steps may be broken down into multiple webpages but have been combined for simplicity.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a webpage such as, for example, free text entry using a keyboard, selection of menu items, check boxes, option boxes, and the like.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A computer-implemented method for generating a job flowchart, said method including:
- receiving, by a second computer-based and from a first computer-based system, a request for generating said job flowchart, wherein said request includes a parameter, wherein said second computer-based system includes a non-transitory memory and processor, and is configured for generating a job flowchart;
- retrieving, by said second computer-based system, job scheduling data from a third computer-based system based on said parameter, wherein said job scheduling data defines automated tasks to be performed by said third computer-based system;
- formatting, by said second computer-based system, said job scheduling data;
- transforming, at said second computer-based system, said job scheduling data into a text file, wherein the job scheduling data is automatically transformed into a text file in response to predetermined intervals;
- assigning, by said second computer-based system, a file extension to said text file based on a charting application; and
- transmitting, by said second computer-based system and to said first computer-based system, said text file to facilitate opening said text file within said charting application, wherein said text file comprises said job flowchart.

2. The computer-implemented method of claim 1, wherein said receiving said request includes receiving said request which originates from a remote user web browser application of said first computer-based system.

3. The computer-implemented method of claim 1, further including storing said job scheduling data within a database of said second computer-based system.

4. The computer-implemented method of claim 1, further including opening, at said second computer-based system, said text file within said charting application to convert said text file to a chart.

5. The computer-implemented method of claim 4, further including saving said chart in a markup language file.

6. The computer-implemented method of claim 1, further including removing redundant dependencies from said job scheduling data.

7. The computer-implemented method of claim 1, wherein said request for said job flowchart is received from a personalized control panel interface at said first computer-based system.

8. The computer-implemented method of claim 7, wherein said personalized control panel interface includes request status information, links to newly created flowcharts, and report configuration tools.

9. The computer-implemented method of claim 1, wherein said request for said job flowchart is stored within a database of said second computer-based system.

10. The computer-implemented method of claim 1, wherein said transforming step includes creating a comma delimited file from said job scheduling data.

11. A system for generating a job flowchart, said system including:
- a network interface communicating with a non-transitory memory;
- said memory communicating with a second computer-based system for generating a job flowchart; and
- said second computer-based system, when executing a computer program, is configured to:
- receive a request, from a first computer-based system, for generating said job flowchart, wherein said request includes a parameter;
- retrieve job scheduling data from a third computer-based system based on said parameter, wherein said job scheduling data defines automated tasks to be performed by said third computer-based system;
- format said job scheduling data;
- transform said job scheduling data into a text file, wherein the job scheduling data is automatically transformed into a text file in response to predetermined intervals;
- assign a file extension to said text file based on a charting application; and
- transmit to said first computer-based system, said text file to facilitate opening said text file within said charting application, wherein said text file comprises said job flowchart.

12. The system of claim 11, wherein said request is received from a remote user web browser application.

13. The system of claim 11, further configured to store said job scheduling data within a database of said second computer-based system.

14. The system of claim 11, wherein said text file is opened within said charting application to convert said text file to a chart.

15. The system of claim 11, further configured to save said chart as a markup language file.

16. The system of claim 11, further configured to remove redundant dependencies from said job scheduling data.

17. The system of claim 11, further comprising a personalized control panel interface, wherein said personalized control panel interface includes request status information, links to newly created flowcharts, and report configuration tools.

18. The system of claim 11, further configured to store said request for said job flowchart within a database of said second computer-based system.

19. A non-transitory, tangible computer-readable memory having stored thereon computer-executable instructions that, if executed by a second computing device for generating a job flowchart, cause said second computing device to perform operations comprising:
- receiving a request from a first computing device for generating said job flowchart, wherein said request includes a parameter;
- retrieving job scheduling data from a third computing device based on said parameter, wherein said job scheduling data defines automated tasks to be performed by said third computing device;
- formatting said job scheduling data;
- transforming said job scheduling data into a text file, wherein the job scheduling data is automatically transformed into a text file in response to predetermined intervals;
- assigning a file extension to said text file based on a charting application; and
- transmitting to said first computing device, said text file to facilitate opening said text file within said charting application, wherein said text file comprises said job flowchart.

* * * * *